United States Patent
Wright et al.

(10) Patent No.: US 7,417,673 B2
(45) Date of Patent: Aug. 26, 2008

(54) OPTICAL AND DIGITAL ZOOMING FOR AN IMAGING DEVICE

(75) Inventors: Antti Wright, Kangasala (FI); Anne Juvonen, Tampere (FI); Ossi Kalevo, Toijala (FI)

(73) Assignee: Nokia Corporation, Espoo (FI)

( * ) Notice: Subject to any disclaimer, the term of this patent is extended or adjusted under 35 U.S.C. 154(b) by 9 days.

(21) Appl. No.: 11/144,383

(22) Filed: May 31, 2005

(65) Prior Publication Data

US 2006/0269265 A1    Nov. 30, 2006

(51) Int. Cl.
*H04N 5/262* (2006.01)

(52) U.S. Cl. .............................. 348/240.1; 348/240.99; 396/60; 396/72

(58) Field of Classification Search .................. 396/60, 396/72; 348/240.1, 240.99
See application file for complete search history.

(56) References Cited

U.S. PATENT DOCUMENTS 5,119,122 A * 6/1992 Kudo et al. ................... 396/60

2004/0012695 A1 * 1/2004 Itsukaichi ................ 348/240.1
2004/0189830 A1   9/2004 Pollard
2005/0128315 A1   6/2005 Mori et al.

FOREIGN PATENT DOCUMENTS

| EP | 1 024 659 | 8/2000 |
|---|---|---|
| EP | 1 622 366 | 2/2006 |
| WO | 03/081903 | 10/2003 |

* cited by examiner

*Primary Examiner*—Kenneth Parker
*Assistant Examiner*—Jay Kim
(74) *Attorney, Agent, or Firm*—Ware, Fressola, Van Der Sluys & Adolphson LLP

(57) ABSTRACT

The invention relates to photographing process, where zooming is carried out. In a method an image is formed through imaging optics onto a light sensitive image sensor in an imaging device and wherein the device is capable of both optical and digital zooming. The method comprises steps of determining an amount of available illumination, determining, according to the amount of available illumination, a ratio between the optical zooming and the digital zooming, and performing, according to which ratio, the optical and the digital zooming. The invention also relates to a device, controller, a computer executable program and a medium.

28 Claims, 3 Drawing Sheets

OPTICAL AND DIGITAL ZOOMING FOR AN IMAGING DEVICE

FIELD OF THE INVENTION

This invention relates generally to photographing process and more particularly to such a process, where—during image capturing process —zooming is carried out.

BACKGROUND OF THE INVENTION

Light has a significant role in photography. Illumination is needed for generating an image onto a light sensitive sensor. The light travels via imaging optics typically through an adjustable aperture. The aperture can be made smaller, wherein the amount of light coming into a camera device is decreased. When the aperture is made larger, the amount of light coming into the camera device is increased. The imaging optics gather the light reflected from the imaged target and project the light to the sensor. If natural lighting is not high enough for photographs, the amount of light can be increased by additional lamps, flash lights, etc.

Optical zooming is a method where the optical magnification of the imaging optics is adjusted, due to which such targets, which are within a photographing region, are formed bigger or smaller in the final image on the image sensor depending on the direction of the zooming. The photographer can hence select the targets, which are wanted to be emphasized in the image, by zooming into them. When the target is in this way optically enlarged, the amount of light seen by individual pixels in the camera sensor becomes smaller, whereby the image becomes darker. This phenomenon, where use of camera optics for optical zooming reduces the amount of light falling on the image sensor when increasing optical magnification, is known in the art of photography.

For typical imaging optics the amount of the light can be estimated by the following equation:

$$f_{act} = f_n \times (M+1)$$

where $f_{act}$ corresponds to actual aperture value, $f_n$ to aperture setting in the imaging optics and M to zooming ratio. The bigger the zooming ratio (i.e. the closer to the image) is the less light is available. For example, if the zooming ratio is less than 1:10, the light does not substantially decrease. However photographing with zooming ratio of 1:1 and aperture value of 16 gives to the aperture the actual value of 32, which is two times greater than the aperture setting, whereby the light loss is two aperture values.

Some solutions are provided for overcoming the problem of light decrease in optical zooming. One possibility is to increase the analog signal gain, whereby the light in the analog signal domain will be amplified, but then because also the noise will be amplified, the signal-to-noise ratio will be typically decreased. Another possibility is to increase the image exposure time, whereby more photons may be gathered and thus a brighter image can be provided. However due to this solution, the image may be blurred if the exposure time becomes too long.

Some cameras have both optical and digital zooming capability. Digital zoom implements the zooming by magnifying the specific region in the digital image using digital image processing techniques after the image has been captured by the optical sensor. Because the image source (unzoomed image) has less information in that region than the final zoomed region needs to have, the image quality may suffer somewhat. Therefore the digital zooming is usually utilized only after the optical zooming has reached its maximum. However, in this case the light decrease in the image due to the optical zooming cannot be prevented, because digital zooming is applied to the optically zoomed image.

Therefore it seems that a solution that could better reserve illumination of the image, when optical zooming is used, is lacking from the related art.

SUMMARY OF THE INVENTION

This invention takes into account the eventual darkening of an image when optical zooming is used and therefore provides a solution that produces zoomed images with better image quality, even during a low lighting imaging situation. For accomplishing this aim, a method, a device, a controller, a computer executable program and a medium are provided.

In the method for digital imaging an image is formed through imaging optics onto a light sensitive image sensor in an imaging device, said imaging device being capable of both optical and digital zooming, said method comprising steps for determining an amount of available illumination, wherein— according to said amount—a ratio between the optical zooming and the digital zooming is determined, according to which ratio the optical zooming and digital zooming are performed.

The device for digital imaging comprises imaging optics and an image sensor for which an image is formed through said imaging optics, said device being capable of both optical and digital zooming further comprising means for determining an amount of available illumination, and—according to said amount—said device is capable of determining a ratio between the optical zooming and the digital zooming, according to which ratio the device is capable of performing the optical zooming and the digital zooming.

The controller for digital imaging device comprises controlling means for both optical and digital zooming, said controller comprising means for determining an amount of available illumination, and—according to said amount—said controller is capable of determining a ratio between the optical zooming and the digital zooming, according to which ratio the controller is capable of controlling the optical zooming and the digital zooming for the device.

The computer executable program for digital imaging wherein an image is formed through the imaging optics onto the light sensitive image sensor in an imaging device, said imaging device being capable of both optical and digital zooming, said program comprising code means adapted, when run on a computer, to carry out the steps of determining an amount of available illumination, and—according to said amount—determining a ratio between the optical zooming and the digital zooming, according to which ratio the optical zooming and the digital zooming are performed.

The medium according to the invention is capable of carrying or storing the above-mentioned computer executable program.

This invention provides a solution for making the selection of digital and optical zoom ratio automatically. The selection is based on the lighting conditions and hence the user does not need to work with optics too strictly, but can rely on the assumption that enough light will be provided for the image. In this way, the solution eases the photographing actions of the user, whereby even a non-professional photographer can take sharp pictures in varying lighting conditions.

According to the invention, it is not necessary, even if possible, to use analog gain for single pixels for compensating for a decrease of the light, thus better maintaining the signal-to-noise ratio.

DESCRIPTION OF THE DRAWINGS

A better understanding of the invention may be obtained from the following considerations taken in conjunction with the accompanying drawings, where.

DETAILED DESCRIPTION OF THE INVENTION

This invention proposes a solution where a surrounding's illumination is utilized for selecting the zooming to be used. An example of the method steps is illustrated in a simplified flow chart in FIG. 1. The utilization of the illumination means that available light level is determined, after which digital and optical zoom ratio is defined. The defined ratio controls how much optical zooming and digital zooming are performed.

Figure 1:
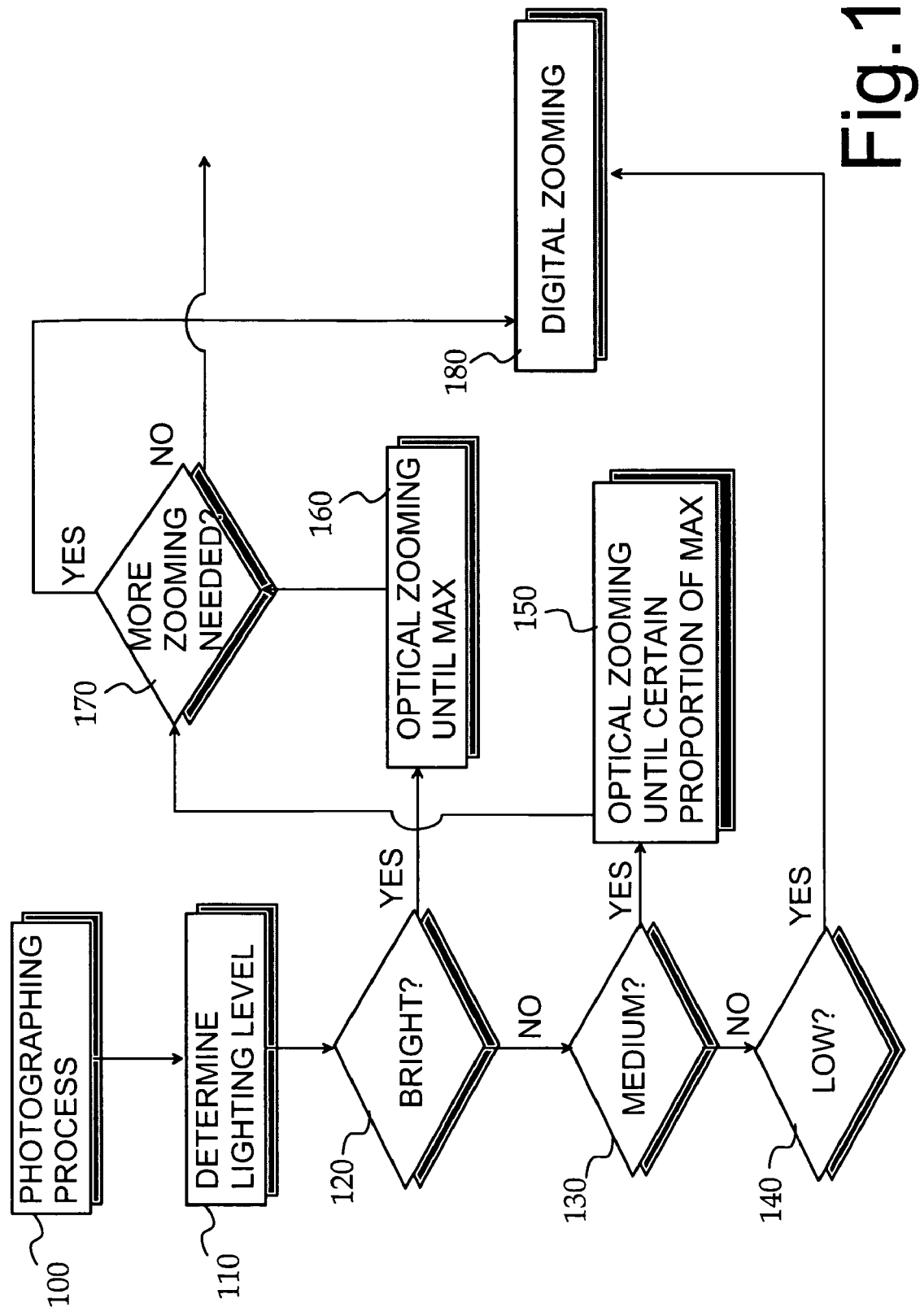
FIG. 1 illustrates an example of method steps for carrying out the invention.

An example of determining the ratio of digital and optical zooming can be carried out according to the example presented in FIG. 1. FIG. 1 illustrates a simplified example for understanding purposes only. It will become clear that the example of FIG. 1 can be modified widely according to the imaging situation. During a photographing process 100 zooming is very often needed for cropping certain targets to be better, for example more centrally presented in the image. In this invention, when zooming is desired, the existing lighting level is determined 110. The lighting condition can be determined by means of exposure time, analog gain and the pixel value level of the image realized using said parameters. It will be, though, appreciated that the lighting condition can be determined by any other means such as light meters e.g. found in the camera device, etc. According to the lighting condition the zooming ratio is defined. The ratio can be determined by comparing the determined lighting condition to an illumination range defining regions for, for example, low, bright and medium illumination target values. It will be appreciated that illumination range can be divided according to the lighting condition into more or less illumination regions than the ones being mentioned. The amount of the regions and the values of the regions can vary according to the situation, which is affected e.g. by the imaging device's capabilities and by the imaging application.

When the lighting condition is bright 120 the optical zoom can be used e.g. until its maximum value 160. After the maximum optical zoom is reached and depending on whether further zooming is needed 170, then subsequent zooming may be carried out digitally 180. In other words, in bright lighting conditions it can be tolerated that optical zooming decreases light level reaching the optical image sensor. The other benefits—such as the use of all pixels—of using optical zoom overcomes a disadvantage of digital zooming, i.e., of not using all the pixels in the final image quality.

Under medium lighting condition 130 the optical zoom can be used at first, after which, if the zooming is needed any further, the digital zoom takes place 180. The amount of the optical zooming may vary between camera devices, but as an example, the optical zoom can be used until it reaches about one half, or some other predefined proportion, of its maximum 150. As said, the proportion is a predefined amount, which depends on the imaging device's capabilities. The proportion can be half of the maximum zoom, but naturally it can be some other proportion. In other words, under medium lighting conditions some amount of optical zooming can be used, but to avoid losing too much light some part of zooming is accomplished digitally.

When the lighting condition is low 140 the digital zoom is used from the beginning 180. This provides better illumination to the final image than with optical zoom. However, it is more appropriate to use digital zoom only until a reasonable zoom level for maintaining the quality as good as possible. If the zooming is nevertheless needed over the reasonable level, the optical zooming is used further. In other words, in low lighting conditions optical zooming is to be avoided, because a light level decrease due to optical magnification has higher disadvantages than those of using digital zooming.

In the digital zooming process the reasonable level of the zoom can be monitored. When the digital zooming exceeds the reasonable level, the zooming is either continued with optical zooming or by alternating optical zooming and digital zooming until the maximum zooming is reached. As an example, the maximum zooming for the alternating zooming, when maximum is 12-fold for both the optical and digital zoom, is 144-fold. In this example the zooming could be alternated as follows under medium lighting condition:

1×-3× optical zoom
3×-9× digital zoom
9×-18× optical zoom
18×-36× digital zoom
36×-72× optical zoom
72×-144× digital zoom In the same example the zooming could be alternated under low lighting condition as follows:

1×-3× digital zoom
3×-9× optical zoom
9×-18× digital zoom
18×-36× optical zoom
36×-72× digital zoom
72×-144× optical zoom Further in the same example the zooming could be alternated under bright lighting condition as follows:

1×-12× optical zoom
12×-144× digital zoom

It will be appreciated by the skilled person that the light level limit values for the illumination regions can vary. The limit values are predetermined, and—as an example—1-100 lux can define the low light level, i.e. dim condition, 100-1000 lux can define the medium condition and >1000 lux can define the bright illumination. It will be appreciated by the skilled person that the levels for illumination are selected for example purposes. The level, however, need not be strict, but it can vary or float from level to level. Suitable selection rules of how to ratio optical and digital zooming may also depend on the capabilities of the camera device, in other words on the sensitivity of the image sensor and on the light gathering power of the imaging/zooming optics.

Similarly the maximum of optical zoom can vary depending on the camera device. Some of the devices can provide ten-fold zooming, whereas another device provides only three-fold zooming. For example with a device having a 200-fold zooming capability it is not necessarily practical to proceed to the extent of 100-fold optical zooming until digital zoom is used. Therefore, it will be appreciated, that the selection for the zooming ratio is made device-specifically depending on the imaging optics.

In photographing situations within short distances, where a flash light is used, the zooming ratio may be determined according to a solution that is used under the bright lighting level. When landscape or other distant targets are photographed with a flash light, the zooming ratio can be determined as described above. However, the zooming may need to be tuned according to the distance of a target.

For this invention the optical zoom can operate continuously with a smooth change in magnification/zoom ratio, or it may also operate in a "stepped" manner where the zoom ratio can only be changed in quantized steps. Some imaging devices may have only few optical zoom positions, wherein the digital zoom needs to be used after all the positions of the optical zoom have been used.

Figure 2:
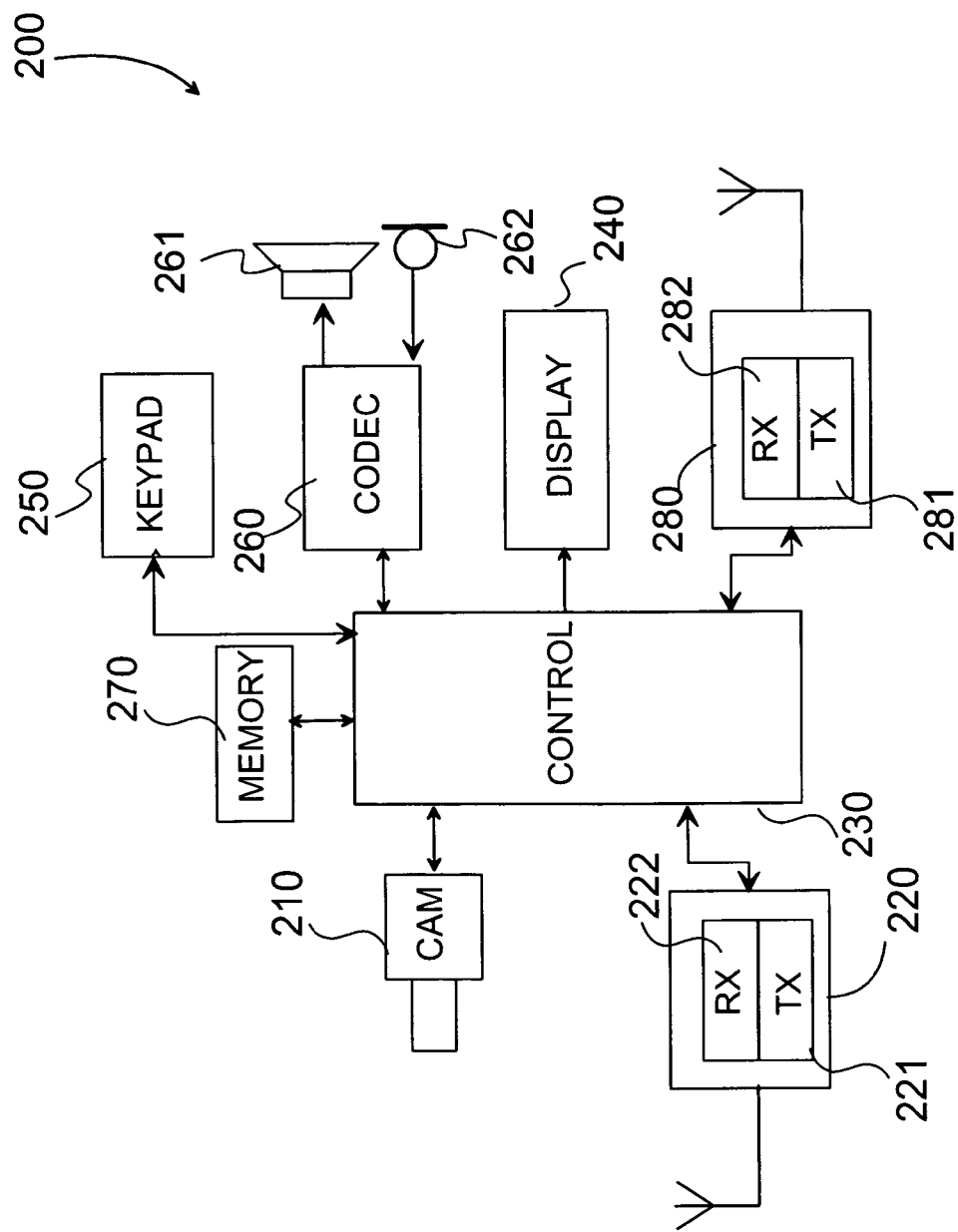
FIG. 2 illustrates an example of a camera device.

One example of a camera device is illustrated in FIG. 2. The camera device can be an imaging phone, however systems comprising any digital imaging camera module can utilize the solution of this description. Such devices include, for example web cameras, camcorders, surveillance cameras and other digital still or video image capturing devices. The device 200 comprises optics 210 or other means that can communicate with the optics for capturing imaging data. The device 200 can also comprise a communication means 220 having a transmitter 221 and a receiver 222 or be connected to such. There can also be other communicating means 280 having a transmitter 281 and a receiver 282. The first communicating means 220 can be adapted for telecommunication and the other communicating means 280 can be a kind of short-range communicating mean suitable for local use and for communicating with another device. The device 200 according to the FIG. 2 also comprises a display 240 for displaying visual information and the imaging data being captured. In addition the device 200 may comprise an interaction means, such as a keypad 250 for inputting data etc. In addition or instead of the keypad 250, the device can comprises stylus, whether the display is a touch-screen display. The device 200 can also comprise audio means 260, such as an earphone 261 and a microphone 262 and optionally a codec for coding (and decoding, if needed) the audio information. The device 200 also comprises a control unit 230 for controlling functions and running applications in the device 200. The control unit 230 may comprise one or more processors (CPU, DSP), one of which for example is for images. The device further comprises memory 270 for storing e.g. data, applications, and computer program code.

Figure 3:
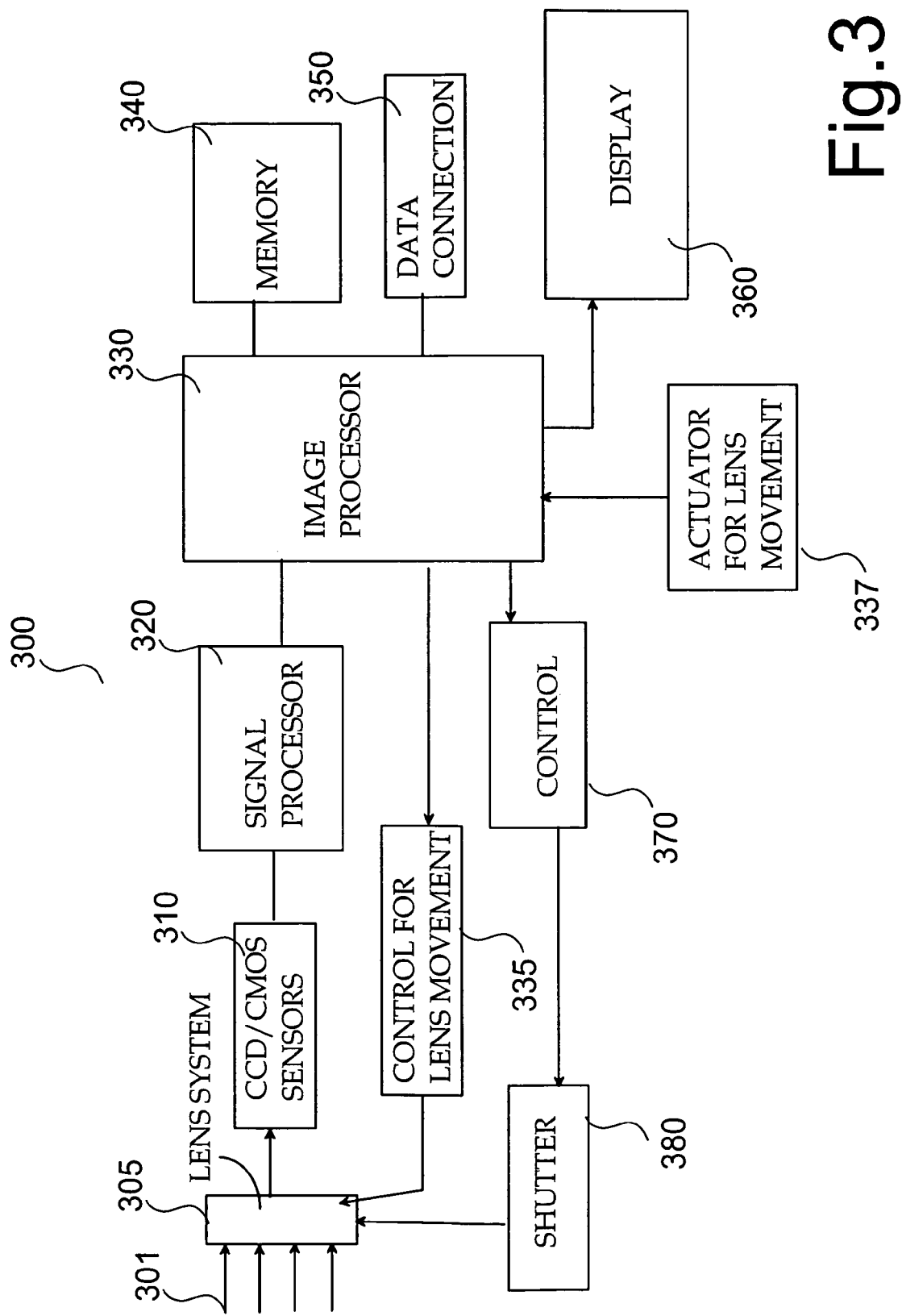
FIG. 3 illustrates an example of an imaging system.

In FIG. 3 an example of an imaging system is shown. The imaging system can belong to a digital camera, whereby it is understood, that the invention is applicable with various imaging devices. The imaging system comprises lens system 305, which gathers the light beams 301 reflected from the target. The lens system 305 may comprise a variable amount of lenses. It is also possible to have no conventional lenses in a system that otherwise carries out the actions of the lens system. The zoom for the lens system can have a straight optical axis or an axis that is folded by e.g. a prism or a reflector. The lens system may also include other capabilities, such as an autofocus. In this example, the light beams 301 travel through the lens system 305 to the light sensor 310, e.g. CCD or CMOS sensor that convert light into electrons. The analog signal from the light sensor 310 is filtered, amplified, and digitized by the signal processor 320. Digital image processor 330 provides processing power and control for e.g. shutter means 380. For the optical zoom the system comprises an actuator 337 and control 335 for moving the lens system 305. Memory 340 stores program code that is needed for various functions, as well image data. The memory 340 can consist of different storage means, removable or fixed. Data connection 350, such as USB connection, provides connectivity to peripheral devices, such as a computer. Imaging data can be transferred to the display 360 for presentation to the user. However, in some camera devices (e.g. a web camera) the display is not necessarily part of the device, but can be reached—if needed—through a cable or a wireless connection.

As stated above, according to the invention the image is provided with sufficient light during the photographing process even though optical zoom is used. In the method, the final amount of the illumination in the image with a desired zooming is the key object of this invention. The examples above provide a few ways for achieving the object, but it should be understood that combinations or modifications of those examples can be used as well. What matters in this solution, is the ratio of the optical and the digital zooming: how much—if at all—the digital zooming is used, and how much—if at all—the optical zooming is used. The order of the zooming can vary. In some situations the optical zooming can begin the zooming process, whereas sometimes the digital zooming may be used at first. Sometimes the zooming can be done alternating the zooming methods, and sometimes the digital zoom may be used at the same time with the optical zoom. Digital zoom may be used at first, because it is fast, by means of which the amount of the light can be measured. After this, the ratio of the actual zooming is decided. It can be seen that the most significant issue in this invention is the ratio of the digital and the optical zoom according to the lighting condition at the time the image is captured.

The method itself can be applied widely to different camera devices or imaging systems. It is also possible to apply the invention with remote control, whereby the camera device provides the lighting level information but the zooming is decided somewhere else, whereby the data transfer connections may be used for carrying the control information. The solution is very usable when the image being captured is aimed to be attached to a MMS message (Multimedia Messaging Service) and intended for a lower resolution display, wherein the image sensor usually has greater resolution than the resolution of the resulted image. This means that instead of using heavily optical zoom, the digital zoom is used to preserve better light power. It will be appreciated by the skilled person, that the implementation of the invention can vary as long as method steps are used for providing the optical and digital zooming ratio for illumination. By understanding that, it will be clear that variations and modifications of the examples are possible without departing from the scope of protection of the invention as set forth in the claims.

What is claimed is:

1. A method, comprising:
    forming an image of a target through imaging optics onto a light-sensitive image sensor in an imaging device, said imaging device having an adjustable optical magnification and an adjustable digital magnification,
    determining an amount of available illumination,
    determining a ratio between the optical magnification and the digital magnification based on said available illumination, and
    adjusting at least one of the optical magnification and the digital magnification based on said ratio,
    wherein the amount of available illumination is categorized as one of low, bright and medium, and said ratio is determined such that
        under the low illumination, the digital magnification is adjusted in priority over the optical magnification,
        under the medium illumination, the optical magnification is adjusted in combination with the digital magnification such that the optical magnification is adjusted to a value smaller than a maximum optical magnification and then the digital magnification is adjusted to a value smaller than a maximum digital magnification or vice versa, and
        under the bright illumination, the optical magnification is adjusted in priority over the digital magnification.

2. The method according to claim 1, further comprising comparing the amount of available illumination to one or more predetermined illumination target values.

3. The method according to claim 2, wherein the low, bright and medium illuminations are defined according to the predetermined illumination target values.

4. The method according to claim 1, wherein under the low illumination the digital magnification is adjusted while keeping the optical magnification at a predetermined value.

5. The method according to claim 1, wherein under the bright illumination,
the optical magnification is adjusted while keeping the digital magnification at a predetermined value when the optical magnification is smaller than or equal to the maximum optical magnification, and then
the digital magnification is adjusted while keeping the optical magnification at the maximum optical magnification.

6. The method according to claim 1, wherein under the medium illumination,
the optical magnification is adjusted while keeping the digital magnification at a predetermined value when the optical magnification is smaller than or equal to a predetermined portion of the maximum optical magnification, and then
the digital magnification is adjusted while keeping the optical magnification at said predetermined portion of the maximum optical magnification.

7. The method according to claim 1, wherein the optical magnification and the digital magnification are adjusted alternately.

8. An apparatus having an adjustable optical magnification and an adjustable digital magnification, comprising:
a light-sensitive image sensor,
imaging optics for forming an image of a target through said imaging optics onto said image sensor, and
a controller, configured to determine an amount of available illumination, to determine a ratio between the optical magnification and the digital magnification based on said available illumination, and to adjust at least one of the optical magnification and the digital magnification based on said ratio,
wherein the amount of available illumination is categorized as one of low, bright and medium, and said ratio is determined such that
under the low illumination, the digital magnification is adjusted in priority over the optical magnification,
under the medium illumination, the optical magnification is adjusted in combination with the digital magnification such that the optical magnification is adjusted to a value smaller than a maximum optical magnification and then the digital magnification is adjusted to a value smaller than a maximum digital magnification or vice versa, and
under the bright illumination, the optical magnification is adjusted in priority over the digital magnification.

9. The apparatus according to claim 8, being capable of comparing the amount of available illumination to one or more predetermined illumination target values.

10. The apparatus according to claim 9, wherein the low, bright and medium illuminations are defined according to the predetermined illumination target.

11. The apparatus according to claim 8, wherein said controller is configured, under the low illumination, to adjust the digital magnification while keeping the optical magnification at a predetermined value.

12. The apparatus according to claim 8, wherein said controller is configured to, under the bright illumination,
adjust the optical magnification while keeping the digital magnification at a predetermined value when the optical magnification is smaller than or equal to the maximum optical magnification, and then
adjust the digital magnification while keeping the optical magnification at the maximum optical magnification.

13. The apparatus according to claim 10, wherein said controller is configured to, under the medium illumination,
adjust the optical magnification while keeping the digital magnification at a predetermined value when the optical magnification is smaller than or equal to a predetermined portion of the maximum optical magnification, and then
adjust the digital magnification while keeping the optical magnification at said predetermined portion of the maximum optical magnification.

14. The apparatus according to claim 8, wherein said controller is configured to adjust the optical magnification and the digital magnification alternately.

15. The apparatus according to claim 8, further comprising a data transfer connection unit.

16. A controller for an imaging device, wherein said imaging device has an adjustable optical magnification and an adjustable digital magnification, and said imaging device comprises a light-sensitive image sensor and imaging optics for forming an image of a target through said imaging optics onto said image sensor, said controller being configured:
to determine an amount of available illumination,
to determine a ratio between the optical magnification and the digital magnification based on said available illumination, and
to adjust at least one of the optical magnification and the digital magnification based on said ratio,
wherein the amount of available illumination is categorized as one of low, bright and medium, and said ratio is determined such that
under the low illumination, the digital magnification is adjusted in priority over the optical magnification.
under the medium illumination, the optical magnification is adjusted in combination with the digital magnification such that the optical magnification is adjusted to a value smaller than a maximum optical magnification and then the digital magnification is adjusted to a value smaller than a maximum digital magnification or vice versa, and
under the bright illumination, the optical magnification is adjusted in priority over the digital magnification.

17. The controller according to claim 16, being capable of comparing the amount of available illumination to predetermined illumination target values.

18. The controller according to claim 17, wherein the low, medium illuminations are defined according to the predetermined illumination target values.

19. The controller according to claim 16, wherein said controller is configured, under the low illumination, to adjust the digital magnification while keeping the optical magnification at a predetermined value.

20. The controller according to claim 16, wherein said controller is configured to, under the bright illumination,
adjust the optical magnification while keeping the digital magnification at a predetermined value when the optical magnification is smaller than or equal to the maximum optical magnification, and then
adjust the digital magnification while keeping the optical magnification at the maximum optical magnification.

21. The controller according to claim 16, wherein said controller is configured to, under the medium illumination,
adjust the optical magnification while keeping the digital magnification at a predetermined value when the optical magnification is smaller than or equal to a predetermined portion of the maximum optical magnification, and then
adjust the digital magnification while keeping the optical magnification at said predetermined portion of the maximum optical magnification.

22. The controller according to claim 21, wherein the predetermined portion is half of the maximum optical magnification.

23. The controller according to claim 16, wherein said controller is configured to adjust the optical magnification and the digital magnification alternately.

24. The controller according to claim 16, being arranged into the imaging device.

25. The controller according to claim 16, being a remote controller.

26. A computer program product, comprising computer readable storage medium, storing program code thereon for execution by an image device, said program code comprising instructions for:
forming an image of a target through imaging optics onto a light-sensitive image sensor in the imaging device, wherein said imaging device having an adjustable optical magnification and an adjustable digital magnification,
determining an amount of available illumination,
determining a ratio between the optical magnification and the digital magnification based on said available illumination, and
adjusting at least one of the optical magnification and the digital magnification based on said ratio,
wherein the amount of available illumination is categorized as one of low, bright and medium, and said ratio is determined such that
under the low illumination, the digital magnification is adjusted in priority over the optical magnification,
under the medium illumination, the optical magnification is adjusted in combination with the digital magnification such that the optical magnification is adjusted to a value smaller than a maximum optical magnification and then the digital magnification is adjusted to a value smaller than a maximum digital magnification or vice versa, and
under the bright illumination, the optical magnification is adjusted in priority over the digital magnification.

27. The computer program product of claim 26, wherein said program code further comprises instructions for comparing the available illumination to one or more predetermined illumination target values so as to determine the available illumination is low, medium or bright illumination.

28. An imaging device having an adjustable optical magnification and an adjustable digital magnification, comprising:
an image sensing means,
an imaging means for forming an image of a target through said imaging means onto said image sensing means, and
a control means for determining an amount of available illumination, determining a ratio between the optical magnification and the digital magnification based on said available illumination, and adjusting at least one of the optical magnification and the digital magnification based on said ratio,
wherein the amount of available illumination is categorized as one of low, bright and medium, and said ratio is determined such that
under the low illumination, the digital magnification is adjusted in priority over the optical magnification,
under the medium illumination, the optical magnification is adjusted in combination with the digital magnification such that the optical magnification is adjusted to a value smaller than a maximum optical magnification and then the digital magnification is adjusted to a value smaller than a maximum digital magnification or vice versa, and
under the bright illumination, the optical magnification is adjusted in priority over the digital magnification.

* * * * *

UNITED STATES PATENT AND TRADEMARK OFFICE
CERTIFICATE OF CORRECTION

PATENT NO. : 7,417,673 B2 Page 1 of 1
APPLICATION NO. : 11/144383
DATED : August 26, 2008
INVENTOR(S) : Wright et al.

It is certified that error appears in the above-identified patent and that said Letters Patent is hereby corrected as shown below:

In column 7, line 63, claim 10, line 3 after "target" --values-- should be inserted.

In column 8, line 40, claim 16, line 17 "." should be --,--.

In column 8, line 53, claim 18, line 1 after "low," --bright and-- should be inserted.

Signed and Sealed this

Fourth Day of November, 2008

JON W. DUDAS
*Director of the United States Patent and Trademark Office*